(12) United States Patent
Ouyang et al.

(10) Patent No.: US 10,878,539 B2
(45) Date of Patent: Dec. 29, 2020

(54) IMAGE-PROCESSING METHOD, APPARATUS AND DEVICE

(71) Applicant: GUANGDONG OPPO MOBILE TELECOMMUNICATIONS CORP., LTD., Guangdong (CN)

(72) Inventors: Dan Ouyang, Guangdong (CN); Guohui Tan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 195 days.

(21) Appl. No.: 15/998,979

(22) Filed: Aug. 17, 2018

(65) Prior Publication Data
US 2019/0130532 A1 May 2, 2019

(30) Foreign Application Priority Data

Nov. 1, 2017 (CN) .......................... 2017 1 1059105

(51) Int. Cl.
*G06T 5/00* (2006.01)
*G06T 5/50* (2006.01)
(Continued)

(52) U.S. Cl.
CPC ............ *G06T 5/002* (2013.01); *G06T 1/20* (2013.01); *G06T 1/60* (2013.01); *G06T 5/003* (2013.01);
(Continued)

(58) Field of Classification Search
CPC .................................................. G06T 5/002
See application file for complete search history.

(56) References Cited

U.S. PATENT DOCUMENTS 10,019,816 B2 * 7/2018 Venkataraman ........ G06T 15/08
10,217,195 B1 * 2/2019 Agrawal ................... G06T 7/11
(Continued)

FOREIGN PATENT DOCUMENTS

CN 104639926 A 5/2015
CN 105100615 A 11/2015
(Continued)

OTHER PUBLICATIONS

European search report for Application No. EP18190354.3, dated Feb. 12, 2019 (9 pages).
(Continued)

*Primary Examiner* — Iman K Kholdebarin
(74) *Attorney, Agent, or Firm* — Ladas & Parry LLP

(57) ABSTRACT

An image-processing method, an apparatus and a device are provided. The method includes: controlling a primary camera to capture a plurality of primary images, and simultaneously controlling a secondary camera to capture a plurality of secondary images; obtaining a reference primary image from the primary images, and obtaining a reference secondary image co-captured with the reference primary image from the secondary images; starting a multithread-based parallel processing mechanism, calling a first thread to perform a multiframe-synthesizing noise-reduction process for the primary images so as to generate a target primary image, and simultaneously calling a second thread to obtain depth information according to the reference primary image and the reference primary image; and performing a blurring process for a background region of the target primary image according to the depth information. Thus, it improves the accuracy of calculating the depth information and the image-processing efficiency thereof.

19 Claims, 5 Drawing Sheets

(51) Int. Cl.
  *G06T 7/194* (2017.01)
  *G06T 7/73* (2017.01)
  *G06T 7/11* (2017.01)
  *G06T 7/00* (2017.01)
  *G06T 7/571* (2017.01)
  *G06T 1/20* (2006.01)
  *G06T 1/60* (2006.01)
  *H04N 5/235* (2006.01)
  *H04N 5/247* (2006.01)

(52) U.S. Cl.
  CPC ............ *G06T 5/50* (2013.01); *G06T 7/11* (2017.01); *G06T 7/194* (2017.01); *G06T 7/571* (2017.01); *G06T 7/74* (2017.01); *G06T 7/97* (2017.01); *H04N 5/2351* (2013.01); *H04N 5/247* (2013.01); *G06T 2210/52* (2013.01)

(56) References Cited

U.S. PATENT DOCUMENTS

| | | | | |
|---|---|---|---|---|
| 10,440,347 | B2* | 10/2019 | Zhou | G06K 9/00 |
| 2003/0012277 | A1* | 1/2003 | Azuma | G06T 7/70 |
| | | | | 375/240.08 |
| 2006/0050381 | A1* | 3/2006 | Konstantinidis | H04N 13/161 |
| | | | | 359/462 |
| 2009/0160963 | A1* | 6/2009 | Kim | H04N 5/2356 |
| | | | | 348/220.1 |
| 2010/0079582 | A1 | 4/2010 | Dunsmore et al. | |
| 2011/0122224 | A1* | 5/2011 | Lou | H04N 19/136 |
| | | | | 348/42 |
| 2012/0038641 | A1* | 2/2012 | Levantovsky | H04N 13/156 |
| | | | | 345/424 |
| 2013/0266210 | A1* | 10/2013 | Morgan-Mar | G06T 7/571 |
| | | | | 382/154 |
| 2014/0072205 | A1* | 3/2014 | Ishii | G06T 15/08 |
| | | | | 382/154 |
| 2015/0062370 | A1 | 3/2015 | Shroff et al. | |
| 2015/0092992 | A1* | 4/2015 | Ishihara | G06K 9/4652 |
| | | | | 382/106 |
| 2015/0264271 | A1* | 9/2015 | Yang | G06T 7/194 |
| | | | | 348/239 |
| 2017/0094243 | A1 | 3/2017 | Venkataraman et al. | |
| 2017/0111789 | A1 | 4/2017 | Tang | |
| 2018/0070023 | A1* | 3/2018 | Oh | G06T 11/00 |
| 2018/0276833 | A1* | 9/2018 | Yoon | H04N 5/2258 |
| 2019/0068889 | A1* | 2/2019 | Lee | H04N 5/232125 |
| 2019/0130532 | A1* | 5/2019 | Ouyang | G06T 7/74 |
| 2019/0132495 | A1* | 5/2019 | Ouyang | H04N 5/2226 |
| 2019/0164256 | A1* | 5/2019 | Ouyang | H04N 5/23229 |
| 2019/0164257 | A1* | 5/2019 | Zhang | H04N 5/2355 |
| 2019/0166286 | A1* | 5/2019 | Ouyang | H04N 5/22525 |
| 2019/0166294 | A1* | 5/2019 | Ouyang | G06T 7/571 |

FOREIGN PATENT DOCUMENTS

| | | |
|---|---|---|
| CN | 105450931 A | 3/2016 |
| CN | 105513007 A | 4/2016 |
| CN | 105979165 A | 9/2016 |
| CN | 106331491 A | 1/2017 |
| CN | 106921829 A | 7/2017 |
| CN | 107085825 A | 8/2017 |
| EP | 2683169 A2 | 1/2014 |
| EP | 2919188 A1 | 9/2015 |
| EP | 2996328 A1 | 3/2016 |
| EP | 3099044 A1 | 11/2016 |

OTHER PUBLICATIONS

First Office Action from China patent office in a counterpart Chinese patent Application 201711059105.4 dated Jul. 2, 2019 (10 pages).
Second Office Action from China patent office in a counterpart Chinese patent Application 201711059105.4 dated Mar. 6, 2020 (13 pages).

* cited by examiner

IMAGE-PROCESSING METHOD, APPARATUS AND DEVICE

CROSS REFERENCE TO RELATED APPLICATIONS

This application claims priorities to Chinese Patent Application No. 201711059105.4, filed on Nov. 1, 2017, and the contents of which are herein incorporated by reference in their entireties.

TECHNICAL FIELD

The described embodiments relate to the technical field of the image-processing technology, and in particular to an image-processing method, an apparatus and a device.

BACKGROUND

With the advance of the manufacturing technology for terminal devices, many current terminal devices have dual cameras arranged therein. Generally, the dual cameras are widely used to acquire depth information, so as to perform correlated image-processing operations according to the depth information, for meeting the diversified requirements of users.

However, in the conventional art, long time is consumed to calculate the depth information, thus it will consume long time to perform the correlated image-processing operations according to the depth information, and have a low image-processing efficiency.

BRIEF DESCRIPTION OF THE DRAWINGS

In order to make the technical solution described in the embodiments of the present disclosure more clear, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

Figure 1:
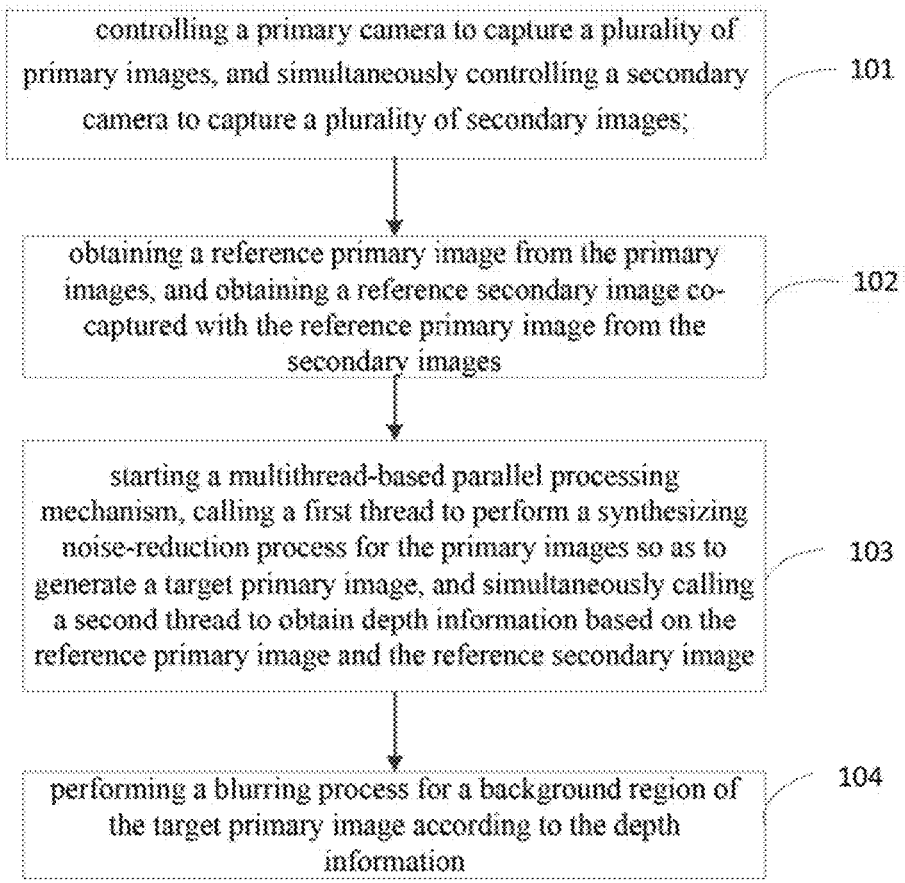
FIG. 1 is a flow chart of an image-processing method according to an embodiment of the present disclosure.

The following embodiments of the disclosure will be described in detail, examples of which are shown in the accompanying drawings, in which the same or similar reference numerals have been used throughout to denote the same or similar elements or elements serving the same or similar functions. The embodiments described below with reference to the accompanying drawings are exemplary only, meaning they are intended to be illustrative of rather than limiting the disclosure.

In the following, an image-processing method, an apparatus and a device provided in embodiments of the present disclosure will be described with reference to drawings.

The image-processing method in embodiments of the present disclosure may be implemented by a hardware apparatus with dual cameras, such as, mobile phone, table PC, personal digital assistant, wearable equipment, etc. The wearable equipment may be smart bracelet, smart watch, smart glasses, etc.

FIG. 1 is a flow chart of an image-processing method according to an exemplary embodiment of the present disclosure. As shown in FIG. 1, the method includes:

At block 101, controlling a primary camera to capture a plurality of primary images, and simultaneously controlling a secondary camera to capture a plurality of secondary images.

In the embodiment of the present disclosure, a primary image captured by the primary camera and a secondary image captured by the secondary camera are used to achieve depth information of a same object in the primary image and the secondary image by calculating, and the primary image is a basis image for an actual image finally imaged. To avoid generating problems of the calculated depth information being inaccurate caused by the primary image greatly different from the secondary image when calculating the depth information according to the primary image and the secondary image, or the finally-imaging image with bad imaging effect caused by the primary image being unclear, the primary camera is controlled to capture the plurality of primary images, and the secondary camera is simultaneously controlled to capture the plurality of secondary images, thus it may select optimal images from the plurality of primary images and the plurality of secondary images, to improve the accuracy of the depth information and the finally-imaging effect. The plurality of primary images and the plurality of secondary images may be captured during a preset period (such as, 1 s) according to a same shooting instruction or a same shooting operation. In addition, the plurality of primary images and the plurality of secondary images are captured under a same frequency, such that any one of the plurality of primary images is co-captured with a corresponding secondary image simultaneously, and the any one of the plurality of primary images and the corresponding co-captured secondary image are in a same group.

Of course, in the related art, the dual cameras have a bad imaging effect in a low-light condition. In a high-light condition, the dual cameras generally have an excellent imaging effect due to sufficient light. The primary images and the secondary images captured in the high-light condition, are generally with high definition, thus the primary camera and the secondary camera are controlled to only capture a primary image and a secondary image simultaneously, and it generally may ensure to calculate the depth information with a high accuracy and achieve an excellent finally-imaging effect. Therefore, to reduce the processing pressure of the whole system, the present disclosure may capture the plurality of primary images and the plurality of secondary imaged only in the low-light condition.

In detail, in an embodiment of the present disclosure, it detects brightness of shooting environment, such as, detecting the brightness of the shooting environment by a photo sensor arranged in the terminal device. When detecting the brightness thereof is less than a preset threshold, it means the brightness of the present environment may influence the imaging effect of the terminal device, thus the primary camera and the secondary camera are controlled to simultaneously capture the plurality of primary images and the plurality of secondary images.

The preset threshold may be a basic brightness value for judging whether the brightness of the environment will influence the imaging effect according to a mass of experimental data. The preset threshold may be relevant to the imaging hardware of the terminal device, and the photosensitivity of the imaging hardware is better, the preset threshold is lower.

At block 102, selecting a reference primary image from the plurality of primary images, and selecting a reference secondary image co-captured with reference primary image in a same group from the plurality of secondary images.

At block 103, starting a multithread-based parallel processing mechanism, calling a first thread to perform a multiframe-synthesizing noise-reduction process for the plurality of primary images so as to generate a target primary image, and simultaneously calling a second thread to obtain depth information according to the reference primary image and the reference secondary image.

As shown in the above, the dual cameras use the primary images and the secondary images to calculate the depth information. To more clearly describe how to obtain the depth information by the dual cameras, the principle of obtaining the depth information by the dual cameras will be described with reference to drawings.

Figure 2:
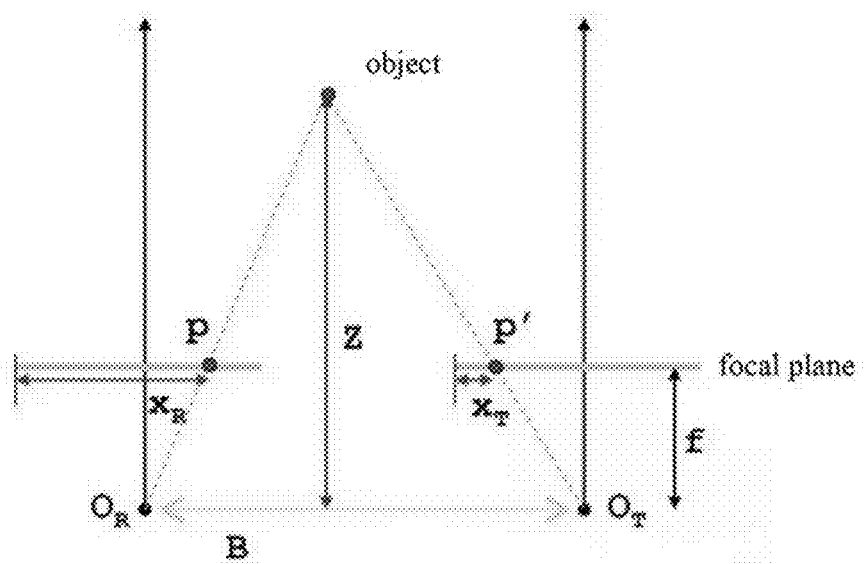
FIG. 2 is a principle schematic view of a triangular measurement according to an embodiment of the present disclosure.

In actual application, eyes distinguish the depth information based on stereo vision, which is same to the principle of the dual cameras distinguishing the depth information, and mainly achieved by the principle of a triangular measurement as shown in FIG. 2. In FIG. 2, an imaging object, locations OR and OT of the dual cameras, and focal planes of the dual cameras are shown in an actual space. The focal planes are spaced from a plane where the dual cameras are located respectively with a distance f, and the dual cameras image at the focal planes respectively to capture two images.

Points P and P' are locations of a same object in the two different captured images. The P point is spaced from a leftmost boundary of an image, where the point P is located, with a distance XR; and the P' point is spaced from a leftmost boundary of another image, where the point P' point is located, with a distance XT. Points OR and OT represent two cameras respectively, and the two cameras are arranged on a same plane, and spaced from each other with a distance B.

According to the principle of the triangular measurement, the object as shown in FIG. 2 is spaced from the plane, where the two camera are located, with a distance Z; and the distance Z meets a formula:

$$\frac{B}{Z} = \frac{(B + X_T) - X_R}{Z - f}.$$

Therefore, it may conclude that $$Z = \frac{B \cdot f}{X_R - X_T} = \frac{B \cdot f}{d},$$

wherein d is a difference between the locations of the same object in the two different captured images. Since B, f are constant values, thus the distance Z of the object may be determined according to the difference d.

In other words, the depth information may be obtained by a a triangular measurement meeting a formula of $$Z = \frac{B \cdot f}{X_R - X_T} = \frac{B \cdot f}{d},$$

wherein B is a distance between the primary camera and the secondary camera; f is a distance between a focal plane and a plane where the primary camera and the secondary camera; Z is a distance between an object and the plane where the primary camera and the secondary camera, and represents the depth information, wherein the object is imaged in the reference primary image at a first point, and the object is also imaged in the reference secondary image at a second point, one of $X_R$ and $X_T$ is a distance between the first point and a leftmost boundary of the reference primary image, and another of $X_R$ and $X_T$ is a distance between the second point and a leftmost boundary of the reference secondary image; and d is a difference between the distance $X_R$ and the distance $X_T$, and represents a location difference between the first point in the reference primary image and the second point in the reference secondary image which are both corresponding to the same object.

Of course, it may adopt other methods rather than the triangular measurement, to calculate the depth information of the primary image, for example, when the primary camera and the secondary camera shoot a same scene, a distance between an object of the scene and the cameras is proportional to a displacement difference or a posture difference between images imaged by the primary camera and the secondary camera. Therefore, in an embodiment of the present disclosure, the distance Z may be achieved according to this proportion.

In other words, in an embodiment of the present disclosure, since a distance between an object and a plane where the primary camera and the secondary camera are located, is proportional with a proportionality coefficient co to a displacement difference or a posture difference between image points of the reference primary image and the reference primary secondary image which are both corresponding to the same object, thus the depth information is obtained according to the proportionality coefficient and displacement difference or the posture differences.

Figure 3:
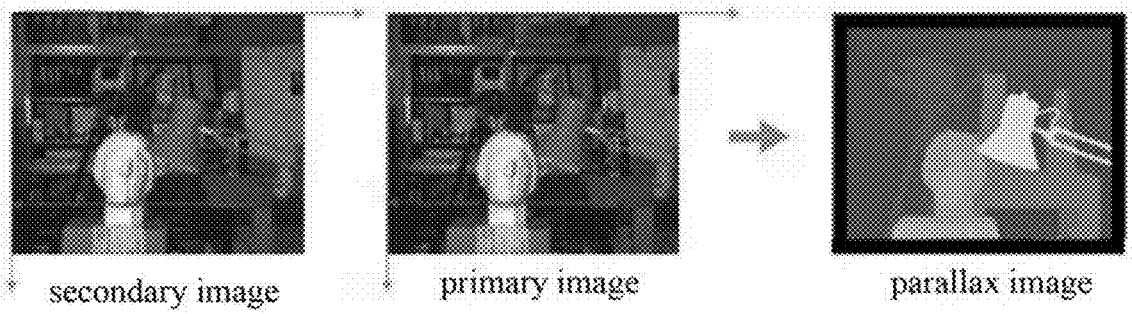
FIG. 3 is a schematic view for obtaining depth information by dual cameras according to an embodiment of the present disclosure.

For example, as shown in FIG. 3, a primary image captured by the primary camera and a secondary image captured by the secondary camera, are used to calculate points with differences, which are represented by a parallax image. The parallax image shows a displacement difference between locations of each same point in the two images. Since the displacement difference is proportional to the distance Z in the triangulation location, the parallax image is often used as an image directly for showing the depth information.

From the above, it can be seen that, when the dual cameras are used to achieve the depth information, it needs to obtain locations of a same object in different images, thus two images captured by the dual cameras for achieving the depth information are more approximate, the efficiency for achieving the depth information and the accuracy of depth information are higher.

It may be understood that, in the embodiment of the present disclosure, since the primary camera and the secondary camera capture the plurality of primary images and the plurality of secondary images simultaneously, thus a primary image and a secondary image co-captured at a same time belong to a same group and are most approximate to each other, and a source primary image and a source secondary image before performing the multiframe-synthesizing noise-reduction process are used to achieve the depth information, thereby ensuring to achieve accurate depth information.

Of course, when shooting in the bad environment, such as, a low-light condition, etc., as mentioned in the above, the plurality of primary images and the plurality of secondary images are with high noise, thus, under this scene, it may perform a multi-frame noise reduction for the plurality of secondary images to further improve the accuracy of the depth information, and then calculate the depth information according to a secondary image after the noise reduction and a primary image.

In detail, a reference primary image is selected from the plurality of primary images, and a reference secondary image is selected from the plurality of primary images and is an image co-captured with the reference primary image in a same group. It should be noted that, in the actual application, the primary camera and the secondary camera capture a plurality of primary images and a plurality of secondary images under a same frequency in the actual shooting process, wherein a primary image and a secondary image co-captured at a same time are in a same group. For example, along a time sequence, the plurality of primary images captured by the primary camera include a primary image 11, a primary image 12, . . . ; the plurality of secondary images captured by the secondary camera include a secondary image 21, a secondary image 22, . . . ; the primary image 11 and the secondary image 21 are in a same group, and the primary image 12 and the secondary image 22 are in a same group, . . . . To further improve the efficiency for achieving the depth information and the accuracy of the depth information, the reference primary image may be a primary image with high definition selected from the plurality of primary images. Alternatively, when capturing many images, it may preliminarily select some primary images and some secondary images with high definition, and then select a reference primary image and a corresponding secondary image from the some primary images and the some secondary images with high definition, to improve the selecting efficiency.

Furthermore, since it needs to consume long time to calculate the depth information, thus a multithread-based parallel processing mechanism starts, a first thread is called to perform a multiframe-synthesizing noise-reduction process for the primary images so as to generate a target primary image, and a second thread is simultaneously called to obtain depth information according to the reference primary image and the reference secondary image. Therefore, on the one hand, the plurality of primary images may be processed by the multiframe-synthesizing noise-reduction process to obtain the target primary image during calculating the depth information, thus it may directly perform a blurring process according to the depth information and the target primary image after obtaining the depth information. Compared with a mode of firstly obtaining the depth information and then performing the noise reduction for the primary images, the present disclosure may greatly improve the image-processing efficiency. On the other hand, it may achieve the target primary image with clear details by the multiframe-synthesizing noise-reduction process, the image quality is high, and the imaging effect after being blurred is excellent.

To distinctly understand the multiframe-synthesizing noise-reduction process, it will describe the multiframes-synthesizing noise-reduction process for the primary images under a low-light scene.

When the environment light is poor, the imaging device, such as the terminal device, generally adopts a mode of auto-improving the sensitivity thereof to shoot, but this mode will cause the images with many noisy points. The multiframe-synthesizing noise-reduction process is configured to reduce the noisy points of the images, for improving the image quality shot in a high sensitivity condition. The principle thereof is in that the noisy points are unorderedly arranged which are well known. In detail, after capturing a plurality of images, noisy points at a same location may be a red noisy point, a green noisy point, or a white noisy point; specifically, no noisy point exists at the same location. Therefore, it has a comparing and filtering condition to filter pixel points belonging to noisy points since the noisy points at the same location of the plurality of images have different pixel values which may counteract with each other, while other pixel points at a same location of the plurality of images for displaying an actual object have substantially-same pixel values, thus the multiframe-synthesizing noise-reduction process may filter the noisy points from actual pixel points for displaying actual objects. In addition, the images are more, it more accurately filters the noisy points and values of the actual pixel points for displaying the actual objects are closer to actual values, thus a synthesized image is clearer. Furthermore, after filtering the noisy points, an algorithm may be further adopted to perform a color-speculating and pixel-replacing process, for removing the noisy points. After the above processes, it can achieve a noise-reduction effect with low image-quality loss.

For example, in a simple multiframe-synthesizing noise-reduction method, it may capture a plurality of images, read values of pixel points corresponding to a same location of the plurality of images, calculate a weighted-average value of the pixel points, and generate a value of a corresponding pixel point at the same location of a synthesized image. By this way, it can achieve a distinct image.

At block 104, performing a blurring process for a background region of the target primary image according to the depth information.

In detail, the block of performing the blurring process for the background region of the target primary image according to the depth information, may includes, but not limited in:
One Possible Mode:

Obtaining first depth information of a foreground region and second depth information of the background region according to the depth information and a focus region; generating a blurring strength according to the first depth information and the second depth information; performing the blurring process for the background region of the target primary image according to the blurring strength. Therefore, it may perform the blurring process with different degrees according to the different depth information, thus the blurred image is more natural and more hierarchical.

After focusing a main object, a space including a part in the front of a focus region wherein a main object is located and another part in the rear of the focus region, where images may be clearly visible by eyes, is in a depth range which is called as the depth information. It may be understood that, the part in the front of the focus region is corresponding to the first depth information of the foreground region, and the another part in the rear of the focus region is corresponding to the second depth information of the background region.

It should be noted that, according to different scenes, it may adopt different modes to determine the first depth information of the foreground region and the second depth information of the background region, which are shown as following:

First Mode:

Obtaining shooting parameters, and determining the first depth information of the foreground region and the second depth information of the background region according to a shooting formula of the camera.

In this exemplary embodiment, the obtained shooting parameters of the primary camera include permissible-circle-of-confusion diameter, aperture value, focal length, focus distance, etc. Thus the first depth information may be calculated by a formula:

the first depth information=(the aperture value*the permissible-circle-of-confusion diameter*the square of the focus distance)/(the square of the focal length+the aperture vale*the permissible-circle-of-confusion diameter*the focus distance);

the foreground region is separated therefrom according to the first depth information, and the second depth information may be calculated by another formula:

the second depth information=(the aperture value*the permissible-circle-of-confusion diameter*the square of the focus distance)/(the square of the focal length−the aperture vale*the permissible-circle-of-confusion diameter*the focus distance).

Second Mode:

Determining a depth map of image regions except for the focus region, according to data of the currently-shooting images captured by the dual cameras, and determining the first depth information of the foreground region in the front of the focus region and the second depth information of the background region in the rear of the focus region.

In detail, in this exemplary embodiment, since the two cameras are located at different locations, a certain angle difference and a certain distance difference are between the two postpositional cameras in relation to the shooting target object, thus a certain phase difference is between previewed-image data captured by the two cameras.

For example, for a point A of a shooting target object, in the previewed-image data captured by the primary camera, the point A is located at a pixel-point coordinate (30, 50); and in the previewed-image data captured by the secondary camera, the point A is located at a pixel-point coordinate (30, 48); thus a phase difference of pixel points in the two previewed-image data corresponding to the point A is 50−48=2.

In this exemplary embodiment, it may pre-built relations between depth information and phase differences according to experimental data or parameters of the dual cameras, and then look up corresponding depth information according to a phase difference in the previewed-image data of each image point of the previewed images captured by the two cameras, thereby to easily obtain the first depth information and the second depth information.

The block of performing the blurring process for the background region of the target primary image according to the blurring strength, may be achieved by different modes, which are exampled as follows:

First Example

Obtaining a blurring coefficient of each pixel according to the blurring strength and the depth information of each pixel in the background region of the target primary image. The blurring coefficient is related to the blurring strength. The blurring coefficient is bigger, the blurring strength is higher. For example, it may calculate a product of multiplying the blurring strength with the depth information of each pixel in the background region of the target primary image, to obtain the blurring coefficient of each pixel, and then perform the blurring process for the background region of the target primary image according to the blurring coefficient of each pixel.

Second Example

The second depth information is farer away from the depth information of the focus region, it means the corresponding background region is farer away from the focus region, and is more irrelevant to the focus region, thus the corresponding blurring strength is larger. In this exemplary embodiment, it may pre-store the corresponding relation between the blurring strength and the difference between the second depth information and the depth information of the focus region. In the corresponding relation, the difference between the second depth information and the depth information of the focus region is larger, the corresponding blurring strength is larger. Thus, it may obtain the difference between the second depth information of the background region of the target primary image and the depth information of the focus region, look up the corresponding relation to obtain a corresponding blurring strength according to the difference thereof, and blur the background region with the corresponding depth information according to the blurring strength.

Figure 4:
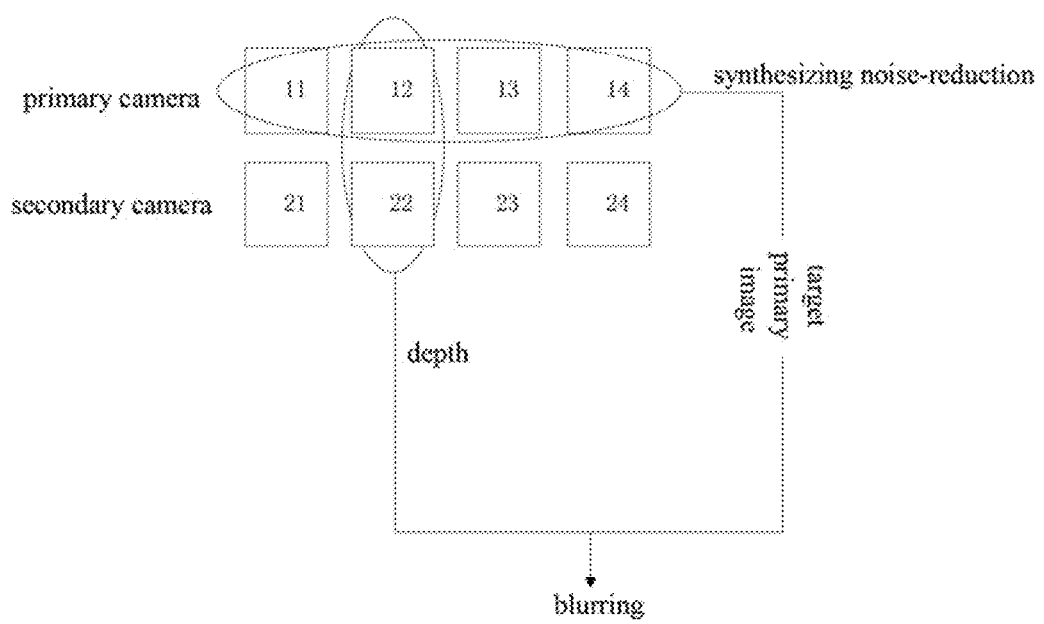
FIG. 4 is a schematic view for implementing the image-processing method in a scene according to an embodiment of the present disclosure.

To distinctly describe the image-processing effect of the embodiments of the present disclosure, some examples under detailed scenes will be shown as follows:

First Scene:

As shown in FIG. 4, after obtaining a shooting instruction, the primary camera and the secondary camera are controlled to shoot simultaneously, for capturing 4 primary images and 4 secondary images. The 4 primary images are numbered as 11, 12, 13, 14 respectively according to a shooting sequence, and similarly, the 4 secondary images are numbered as 21, 22, 23, 24 respectively.

A reference primary image 12 is selected from the primary images, and a reference secondary image 22, which is co-captured with the reference primary image 12 in a same group, is selected from the secondary images. Then, a multithread-based parallel processing mechanism starts, a first thread is called to perform a multiframe-synthesizing noise-reduction process for the primary images so as to generate a target primary image, and a second thread is called to calculate depth information according to the reference primary image 12 and the reference secondary image 22. Therefore, if it consumes 400 ms to perform the noise-reduction process for the primary images and consumes 800 ms to obtain the depth information, the conventional art needs to calculate the depth information and perform the noise-reduction process for the primary images in sequence and it needs 1200 ms to complete the above processes. However, the image-processing method of the present disclosure only needs 800 ms to complete the above processes, thus it greatly improve the image-processing efficiency thereof. Furthermore, in the present disclosure, the primary camera captures the plurality of primary images and perform the multiframe-synthesizing noise-reduction process for the plurality of primary images, thus it may avoid the problem of achieving a bad image-processing effect caused by processing only one primary image with low quality under a low-light condition, and improve the image-processing effect.

Second Scene

Figure 5:
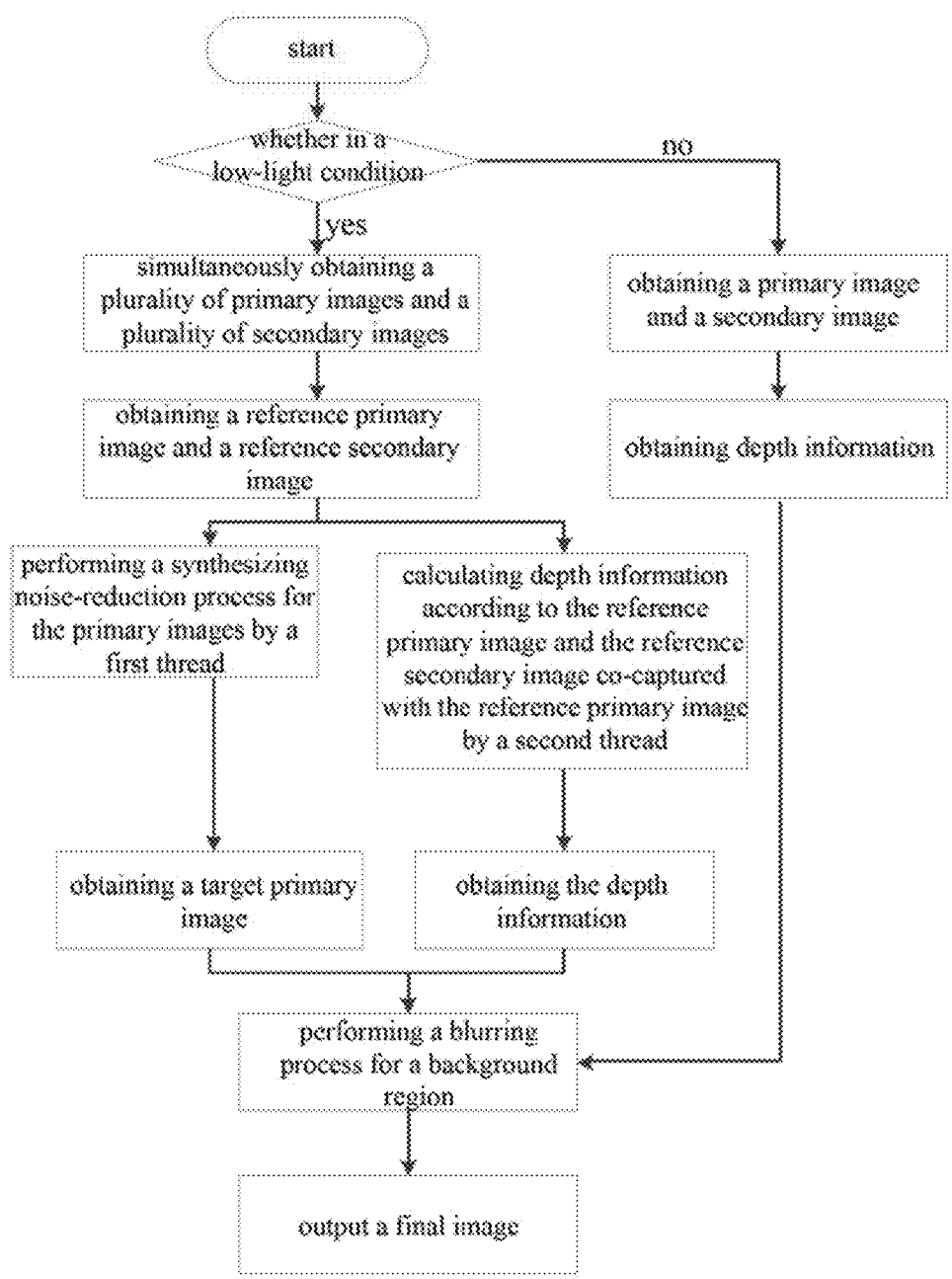
FIG. 5 is a flow chart of an image-processing method according to a specific embodiment of the present disclosure.

Under this scene, it may determine whether to adopt the multiframe-synthesizing noise-reduction process according to the current ambient brightness. The multiframe-synthesizing noise-reduction process may be performed under a low-light condition rather than a high-light condition. In detail, as shown in FIG. 5, it may detect the brightness of the shooting environment, if the brightness thereof is less than a preset threshold, it means the current environment is dark, the system controls the primary camera and the secondary camera to simultaneously capture the plurality of primary images and the plurality of secondary images, thus one of the primary images is selected as the reference primary image, and the reference secondary image which is co-captured with the reference primary image is selected therefrom (for example, if the second frame of the primary images is selected as the reference primary image, it will also select the second frame of the secondary images as the reference primary image).

Then, the multithread-based parallel processing mechanism starts, the first thread is called to perform the multiframe-synthesizing noise-reduction process for the primary images so as to generate a target primary image, and a second thread is simultaneously called to calculate the depth information according to the reference primary image and the reference secondary image. Thus, the multiframe-synthesizing noise-reduction process and the depth-information calculation may be performed simultaneously. Furthermore, the depth information is calculated by the images before performing the multiframe-synthesizing noise-reduction process, thus it may ensure the accuracy of calculating the depth information, and achieve an excellent image-processing effect after perform the blurring process for the background region of the target primary image according to the obtained depth information and the target primary image.

In summary, the image-processing method of the embodiments of the present disclosure, controls the primary camera to capture the plurality of primary images, simultaneously controls the secondary camera to capture the plurality of secondary images, selects the reference primary image from the plurality of primary images, and selects the reference secondary image co-captured with the reference primary image from the plurality of secondary images, starts the multithread-based parallel processing mechanism, calls the first thread to perform the multiframe-synthesizing noise-reduction process for the plurality of primary images so as to generate the target primary image, calling the second thread to obtain the depth information according to the reference primary image and the reference primary image, and performs the blurring process for the background region of the target primary image according to the depth information. Thus, it improves the accuracy of calculating the depth information and the image-processing efficiency.

Figure 6:
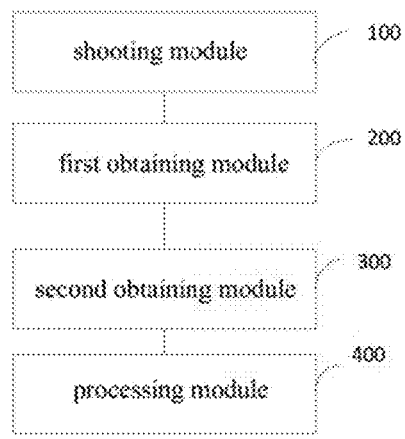
FIG. 6 is a structural schematic view of an image-processing apparatus according to an embodiment of the present disclosure.

To achieve the above embodiments, the present disclosure further provides an image-processing apparatus. FIG. 6 is a structural schematic view of an image-processing apparatus according to an exemplary embodiment of the present disclosure. As shown in FIG. 6, the image-processing apparatus includes: a shooting module 100, a first obtaining module 200, a second obtaining module 300 and a processing module 400.

The shooting module 100 is configured to control a primary camera to capture a plurality of primary images, and simultaneously control a secondary camera to capture a plurality of secondary images.

Figure 7:
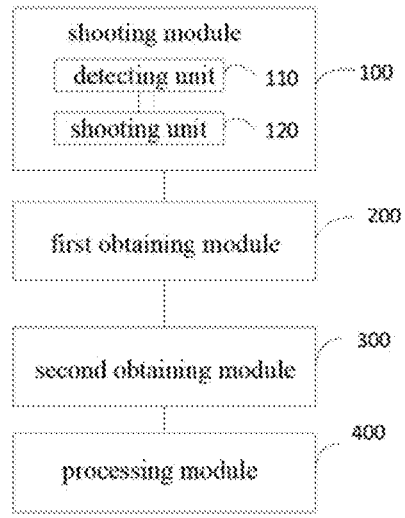
FIG. 7 is a structural schematic view of an image-processing apparatus according to another embodiment of the present disclosure.

In an embodiment of the present disclosure, as shown in FIG. 7 which is based on FIG. 6, the shooting module 100 includes a detecting unit 110 and a shooting unit 120.

The detecting unit 110 is configured to detect brightness of shooting environment.

The shooting unit 120 is configured to control the primary camera to capture the plurality of primary images, and simultaneously control the secondary camera to capture the plurality of secondary images when detecting the brightness is less than a preset threshold.

The first obtaining module 200 is configured to obtain a reference primary image from the primary images, and obtain a reference secondary image co-captured with the reference primary image in a same group from the secondary images.

The second obtaining module 300 is configured to start a multithread-based parallel processing mechanism, call a first thread to perform a multiframe-synthesizing noise-reduction process for the primary images as so to generate a target primary image, and simultaneously call a second thread to obtain depth information according to the reference primary image and the reference secondary image.

The processing module 400 is configured to perform a blurring process for a background region of the target primary image according to the depth information.

Figure 8:
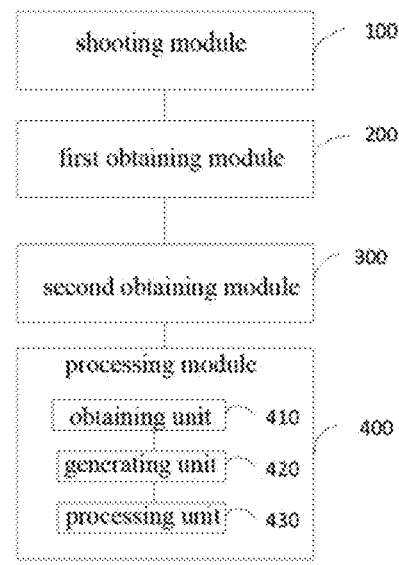
FIG. 8 is a structural schematic view of an image-processing apparatus according to other embodiment of the present disclosure.

In an embodiment of the present disclosure, as shown in FIG. 8 which is based on FIG. 6, the processing module 400 includes an obtaining unit 410, a generating unit 420 and a processing unit 430.

The obtaining unit 410 is configured to obtain first depth information of a foreground region and second depth information of the background region according to the depth information and a focus region.

The generating unit 420 is configured to generate a blurring strength according to the first depth information and the second depth information.

The processing unit 430 is configured to perform the blurring process for the background region of the target primary image according to the blurring strength.

It should be noted that, the above descriptions for the methods in the above embodiments, are also appropriate for the apparatus of the exemplary embodiment of the present disclosure. They have similar operational principle, thus it will be not described herein.

The modules of the image-processing apparatus are only illustrated as an example. In other embodiments, the image-processing apparatus may be divided into other modules different from the above modules, to complete the whole or some of functions of the image-processing apparatus.

In summary, the image-processing apparatus of the exemplary embodiment of the present disclosure, controls the primary camera to capture the plurality of primary images, simultaneously controls the secondary camera to capture the plurality of secondary images, selects the reference primary image from the plurality of primary images, and selects the reference secondary image co-captured with the reference primary image from the plurality of secondary images, starts the multithread-based parallel processing mechanism, calls the first thread to perform the multiframe-synthesizing noise-reduction process for the plurality of primary images so as to generate the target primary image, calling the second thread to obtain the depth information according to the reference primary image and the reference primary image, and performs the blurring process for the background region of the target primary image according to the depth information. Thus, it improves the accuracy of calculating the depth information and the image-processing efficiency.

Figure 9:
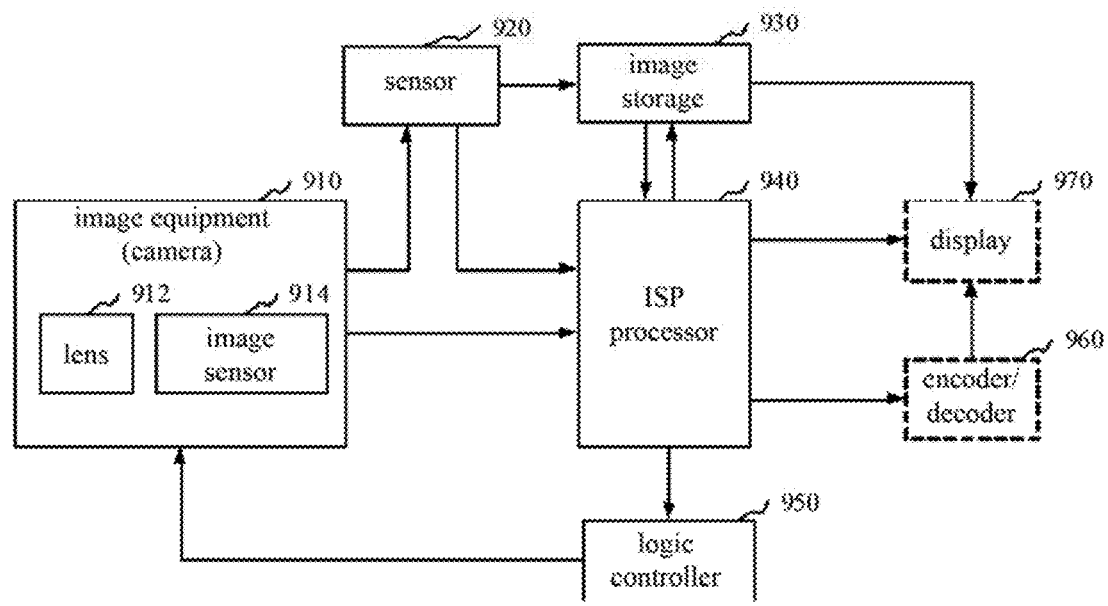
FIG. 9 is a schematic view of an image-processing circuit according to an embodiment of the present disclosure.

In an embodiment, the present disclosure further provides a computer device. The computer device includes an image-processing circuit, which may be achieved by a hardware or software component and include various processing units with ISP (Image Signal Processing) pipelines. FIG. 9 is a schematic view of an image-processing circuit according to an exemplary embodiment of the present disclosure. As shown in FIG. 9, to convenient for describing, it only shows components related to the image-processing technology in the exemplary embodiment of the present disclosure.

As shown in FIG. 9, the image-processing circuit includes an ISP processor 940 and a logic controller 950. Image data captured by an image equipment 910 is firstly processed by the ISP processor 940. The ISP processor 940 analyzes the image data to capture image statistical information which are configured to determine one or more control parameter of the image equipment 910. The image equipment 910 may be a camera including one or more lens 912 and an image sensor 914. The image sensor 914 may include a color filter array (such as, Bayer filter). The image sensor 914 may obtain light intensity and wavelength information captured by each image pixel of the image sensor 914, and provide original image data which may be processed by the ISP processor 1040. A sensor 920 (such as, a gyroscope) may provides image-processing parameters (such as, anti-shaking parameters) collected by the sensor 920 to the ISP processor 940 according to the type of an interface of the sensor 920. The interface of the sensor 920 may be a SMIA (Standard Mobile Imaging Architecture) interface, a serial or parallel camera interface, or a combination of the above interfaces.

In addition, the image sensor 914 also may transmit the original image data to the sensor 920, and then the sensor 920 may provide the original image data to the ISP processor 940 according to the type of the interface of the sensor 920, alternatively, the sensor 920 may store the original image data in an image storage 930.

The ISP processor 940 may process the original image data pixel by pixel in a variety of formats. For example, each image pixel may have a bit depth with 8, 10, 12 or 14 bits, and the ISP processor 940 may perform one or more image-processing operations for the original image data, and collect the statistical information of the image data. The image-processing operations may be performed according to a same bit depth or different bit depths.

The ISP processor 940 may further receive pixel data from the image storage 930. For example, original pixel data may be transmitted to the image storage 930 via the interface of the sensor 920, and then the original pixel data stored in the image storage 930 is transmitted to the ISP processor 940 for being processed. The image storage 930 may be a part of a storing device, or an independent special storage in a storage device or an electronic device, and have a DMA (Direct Memory Access) property.

When receiving the original image data from the interface of the image sensor 914, the interface of the sensor 920 or the image storage 930, the ISP processor 940 may perform one or more image-processing operation, such as a time domain filtering operation. The processed image data may be transmitted to the image storage 930 for performing other processes before being displayed. The ISP processor 940 receives the processed data from the image storage 930, and then perform an image-processing operation of the primitive domain and the RGB and YCbCr color space for the processed data, thus the data processed by the ISP processor 940 may be transmitted to a display 970 for being viewed by viewers and/or being further processed by a graphics engine or a GPU (Graphics Processing Unit). In addition, the output of the ISP processor 940 may be transmitted to the image storage 930, and the display 970 may read the image data from the image storage 930. In an exemplary embodiment, the image storage 930 may be configured to include one or more frame buffer. In addition, the output of the ISP processor 940 may be sent to an encoder/decoder 960, for encoding/decoding the image data. The encoded image data may be stored, and be decoded before displaying in the display 970. The encoder/decoder 960 may be achieved by a CPU, or a GPU, or a coprocessor.

The statistical data determined by the ISP processor 940, may be transmitted to the logic controller 950. For example, the statistical data may be statistical information of the image sensor 914 relevant to automatic exposure, automatic white balance, automatic focus, flicker detection, black level compensation, shadow correction of the lens 912, etc. The logic controller 950 may include a CPU or a microcontroller for performing one or more thread, and the one or more thread may determines control parameters of the image equipment 910 and control parameters of the ISP processor 940 according to the received statistical data. For example, the control parameters of image equipment 910 may include control parameters of the sensor 920 (such as, grain, integral time of exposure controlling, anti-shaking parameter, etc.), flicker control parameters of the camera, control parameters of the lens 912 (such as, focal length of focusing or zooming), or combinations of these parameters. ISP control parameters may includes a gain for automatic white balance and color adjusting (such as, in a duration of RGB processing), a color correction matrix, and a shadow correction parameter of the lens 912.

Figure 10:
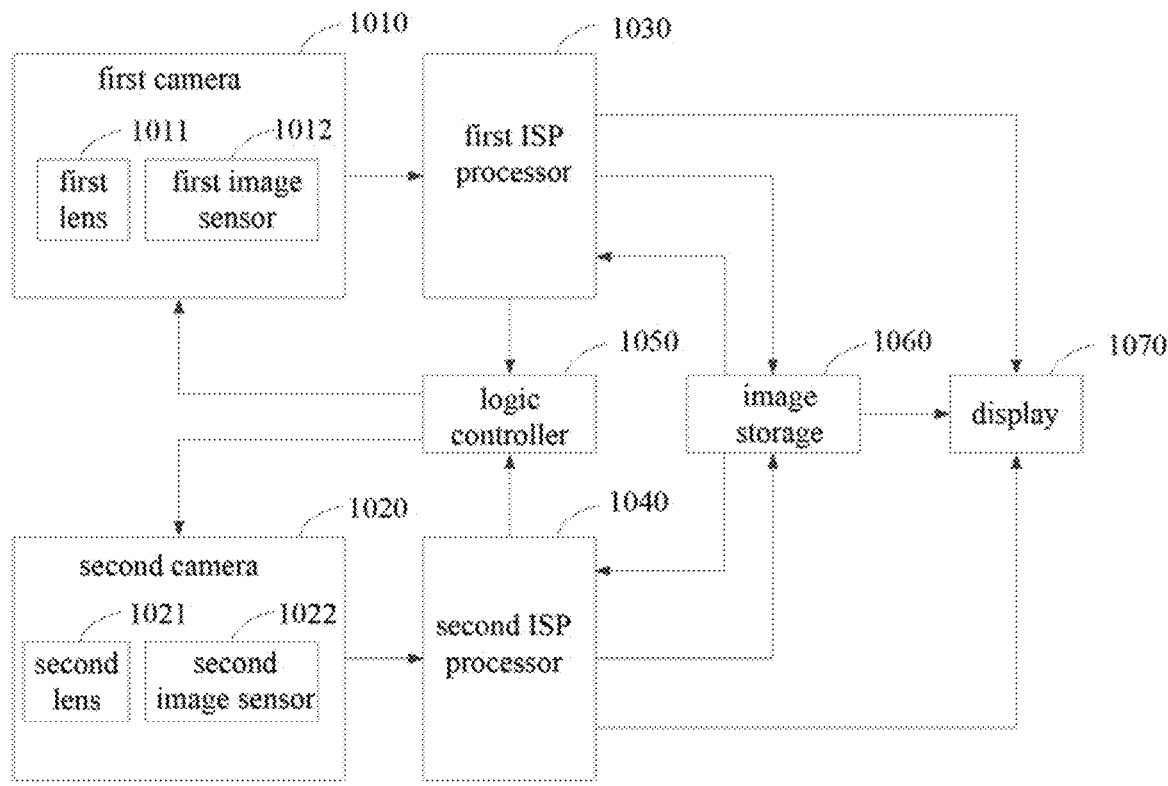
FIG. 10 is a schematic view of another image processing circuit according to another exemplary embodiment of the present disclosure.

In another embodiment, the present disclosure further provides another image-processing circuit. FIG. 10 is a schematic view of another image-processing circuit according to another exemplary embodiment of the present disclosure. As shown in FIG. 10, the image-processing circuit includes a first ISP processor 1030, a second ISP processor 1040, and a logic controller 1050. The first ISP processor 1030 is configured to process images transmitted from a first camera 1010, and the second ISP processor 1040 is configured to process images transmitted from a second camera 1020. The first camera 1010 and the second camera 1020 may be similar with the camera used as the image equipment 910 as shown in FIG. 9, and each thereof comprises one or more lens and an image sensor. For example, the first camera 1010 comprises one or more first lens 1011 and a first image sensor 1012; similarly, the second camera comprises one or more second lens 1021 and a second image sensor 1022; and the operation thereof is similar with those of the camera used as the image equipment 910 as shown in FIG. 9, thus it will not describe herein.

In the exemplary embodiment of the present disclosure, it does not limit performance parameters (such as, focal length, aperture size, resolution, etc.) of the first camera 1010 and the second camera 1020. In some embodiments, the first camera 1010 may be one of a telephoto camera and a wide-angle camera, and the second camera 1020 may be also one of the telephoto camera and the wide-angle camera. The first camera 1010 and the second camera 1020 may be both disposed on a same plane of a terminal, for example, being simultaneously disposed at the back or the front of the terminal. A distance between the first camera 1010 and the second camera 1020 disposed on the terminal, may be determined by the size of the terminal or the shooting effect, etc. In some embodiments, to make objects captured by the left and right cameras (that is, the first camera 1010 and the second camera 1020) with high degree of overlapping, it is better to assemble the left and right camera closer, such as, the distance therebetween is not larger than 10 mm.

A first image gathered by the first camera 1010 is transmitted to the first ISP processor 1030. After processing the first image, the first ISP processor 1030 may send statistical data of the first image (such as, image brightness, image contrast value, image color, etc.) to the logic controller 1050. The control controller 1050 may determine control parameters of the first camera 1010 according to the statistical data, thus the first camera 1010 may perform related operations, such as, auto-focusing, auto-exposing, etc. The first image processed by the first ISP processor 1010 may be stored in an image storage 1060. The first processor 1030 also may read images stored in the image storage 1060 for processing. In addition, the first image processed by the ISP processor 1030 may be directly transmitted to a display 1070 for displaying. Alternatively, the display 1070 may read images stored in image storage 1060 for displaying.

The second camera 1020 has a processing flow similar with that of the first camera. The image sensors and the ISP processors has functions and processing flows similar with those of the above image sensor and the above ISP processor as shown in FIG. 9, thus it will not describe herein.

It should be noted that, the first ISP processor 1030 and the second ISP processor 1040 may be integrated together to be a single ISP processor, which is capable of respectively processing data from the first image sensor 1012 and the second image sensor 1022.

Furthermore, the image-processing circuit may further includes a CPU and a power-supplying module not shown in FIG. 10. The CPU is connected to the logic controller 1050, the first ISP processor 1030, the second ISP processor 1040, the image storage 1060 and the display 1070 for controlling the whole structure. The power-supplying module is configured to supply the power to the above modules respectively.

The following will describe the blocks of the image-processing method achieved by the image-processing technology as shown in FIG. 9 or FIG. 10, which include:

controlling a primary camera to capture a plurality of primary images, and simultaneously controlling a secondary camera to capture a plurality of secondary images;

obtaining a reference primary image from the plurality of primary images, and obtaining a reference secondary image co-captured with the reference primary image in a same group from the secondary images;

starting a multithread-based parallel processing mechanism, calling a first thread to perform a multiframe-synthesizing noise-reduction process for the primary images so as to generate a target primary image, and simultaneously calling a second thread to obtain depth information according to the reference primary image and the reference secondary image;

performing a blurring process for a background region of the target primary image according to the depth information.

To achieve the above embodiments, the present disclosure further provides a nonvolatile computer-readable memory medium, when instructions stored in the memory medium run in a processor, the image-processing method of the above embodiments is implemented.

In the description of this specification, reference terms "one embodiment", "some embodiments", "example", "specific example", or "some examples" in connection with the embodiment or example are described by specific features, the structure, material, or characteristic which is included in one embodiment of the disclosure or examples in this specification. The schematic representations of the terms are not necessarily to the same embodiment or example. Furthermore, the particular features, structures, the material, or characteristics may be any one or more of the embodiments or examples combined in a suitable manner. In addition, in the case of not mutually inconsistent, persons skilled in the art can combine or assemble different embodiments or examples.

In addition, the terms "first" and "second" are used for descriptive purposes only, and should not be taken to indicate or imply relative importance or implicitly indicate the number of technical features. Thus, defining features "first" and "second" may explicitly or implicitly include at least one of the features. In the description of the present disclosure, a "plurality" means at least two, for example, two or three, unless clearly specifically defined.

Flowchart diagrams, any processes or methods described by different manners can be understood that units, fragments or portions of executable instruction codes for implementing specific logical functions or steps. Persons skilled in related art should be noted that the embodiments of the present disclosure can be implemented in a substantially simultaneous manner or in a reverse order to perform functions.

Logic units and actions at blocks in the flowchart are defined as a sequence table of executable instructions for implementing logical functions. The sequence table of executable instructions can be embodied in any computer-readable medium for an instruction execution system, an apparatus, or a device (e.g., computer-based system, a system having a processor, or an instruction execution system, an apparatus, or a device to access the instructions and execute the instructions). In the present disclosure, "computer-readable medium" can include of storage, communication, propagation, transmission programs or the combinations. The "computer-readable medium" includes at least one of electrical wired connection portion (e.g., an electronic devices), a portable computer diskette (e.g., a magnetic device), a random access memory (RAM), a read-only memory (ROM), erasable programmable read-only memory (e.g., EPROM or flash memory), fiber optic devices, and a portable compact disc read-only memory (e.g., CDROM). In addition, the computer-readable medium can even be paper or suitable medium on which the programs are printed. For example, the paper or suitable medium are optically scanned. The programs on the paper or suitable medium are electronically obtained using compiled and interpreted manners and stored in computerized memory.

It should be understood that portions of the present disclosure may be implemented in hardware, software, firmware, or combinations thereof. In the above-described embodiments, a plurality of actions or methods may be stored in a memory and are executed by software or firmware implemented in a suitable instruction execution system. If actions at the blocks or methods may be implemented, for example, in hardware, as in another embodiment, any one of the following techniques or combinations thereof in the related art may be used. The techniques includes a discrete logic circuit of logic gate circuits to implement logic functions on data signals, an application specific integrated circuit having appropriate combinational logic gate circuits, a programmable gate array (PGA), and a field programmable gate array (FPGA).

Persons skilled in the related art should be noted that all or part of actions in the above-described embodiments can be implemented by program instructions executable in hardware. The program instructions are stored in computer-readable medium and the program instructions are performed for at least one of actions at the blocks.

Furthermore, each of functional units may be integrated in one processing unit or be a separate physical unit. For example, two or more units are integrated in a single unit. The integrated units can be implemented in a form of hardware or software unit. In one embodiment, when the integrated units are implemented in the form of a software unit which is sold or used as an independent product, the integrated units can be stored in a computer-readable storage medium.

The computer-readable storage medium can be a read-only memory, a magnetic disk or optical disk. As is understood by a person skilled in the art, the foregoing preferred embodiments of the present disclosure are illustrative rather than limiting of the present disclosure. It is intended that they cover various modifications and similar arrangements be included within the spirit and scope of the present disclosure, the scope of which should be accorded the broadest interpretation so as to encompass all such modifications and similar structures.

What is claimed is:

1. An image-processing method, comprising:
   controlling a primary camera to capture a plurality of primary images, and simultaneously controlling a secondary camera to capture a plurality of secondary images;
   obtaining a reference primary image from the plurality of primary images, and obtaining a reference secondary image co-captured with the reference primary image in a same group from the plurality of secondary images;
   starting a multithread-based parallel processing mechanism, calling a first thread to perform a multiframe-synthesizing noise-reduction process for the plurality of primary images so as to generate a target primary image, and simultaneously calling a second thread to obtain depth information according to the reference primary image and the reference secondary image;
   performing a blurring process for a background region of the target primary image according to the depth information.

2. The method of claim 1, wherein the block of controlling a primary camera to capture a plurality of primary images and simultaneously controlling a secondary camera to capture a plurality of secondary images, comprises:
   detecting brightness of shooting environment;
   controlling the primary camera to capture the plurality of primary images, and simultaneously controlling the secondary camera to capture the plurality of secondary images, when detecting the brightness is less than a preset threshold.

3. The method of claim 1, wherein the block of performing a blurring process for a background region of the target primary image according to the depth information, comprises:
   obtaining first depth information of a foreground region and second depth information of the background region according to the depth information and a focus region;
   generating blurring strength according to the first depth information and the second depth information;
   performing the blurring process for the background region of the target primary image according to the blurring strength.

4. The method of claim 3, wherein the primary camera has shooting parameters comprising permissible-circle-of-confusion diameter, aperture value, focal length and focus distance, and the first depth information is obtained by a formula:
   the first depth information=(the aperture value*the permissible-circle-of-confusion diameter*the square of the focus distance)/(the square of the focal length+the aperture vale*the permissible-circle-of-confusion diameter*the focus distance);
   the second depth information is obtained by another formula:
   the second depth information=(the aperture value*the permissible-circle-of-confusion diameter*the square of the focus distance)/(the square of the focal length−the aperture vale*the permissible-circle-of-confusion diameter*the focus distance).

5. The method of claim 3, wherein the first depth information and the second depth information are obtained according to a depth map of image regions except for the focus region.

6. The method of claim 3, wherein the block of performing the blurring process for the background region of the target primary image according to the blurring strength, comprises:
   obtaining a blurring coefficient of each pixel, according to the blurring strength and depth information of each pixel in the background region of the target primary image;
   performing the blurring process for the background region of the target primary image according to the blurring coefficient of each pixel.

7. The method of claim 4, wherein the block of obtaining a blurring coefficient of each pixel according to the blurring strength and depth information of each pixel in the background region of the target primary image, comprises:
   calculating a product by multiplying the blurring strength with the depth information of each pixel in the background region of the target primary image, to obtain the blurring coefficient of each pixel.

8. The method of claim 1, wherein the depth information is obtained by a triangular measurement meeting a formula of $$Z = \frac{B \cdot f}{X_R - X_T} = \frac{B \cdot f}{d},$$

wherein B is a distance between the primary camera and the secondary camera; f is a distance between a focal plane and a plane where the primary camera and the secondary camera; Z is a distance between an object and the plane where the primary camera and the secondary camera, and represents the depth information, wherein the object is imaged in the reference primary image at a first point, and the object is also imaged in the reference secondary image at a second point, one of $X_R$ and $X_T$ is a distance between the first point and a leftmost boundary of the reference primary image, and another of $X_R$ and $X_T$ is a distance between the second point and a leftmost boundary of the reference secondary image; and d is a difference between the distance $X_R$ and the distance $X_T$, and represents a location difference between the first point in the reference primary image and the second point in the reference secondary image which are both corresponding to the same object.

9. The method of claim 1, wherein a distance between an object and a plane where the primary camera and the secondary camera are located, is proportional with a proportionality coefficient to a displacement difference or a posture difference between image points of the reference primary image and the reference primary secondary image which are both corresponding to the same object, and the depth information is obtained according to the proportionality coefficient and displacement difference or the posture differences.

10. The method of claim 1, wherein the plurality of primary images and the plurality of secondary images are captured during a preset period according to a same shooting instruction or a same shooting operation.

11. The method of claim 1, wherein the plurality of primary images and the plurality of secondary images are captured under a same frequency, such that any one of the plurality of primary images is co-captured with a corresponding secondary image simultaneously, and the any one of the plurality of primary images and the corresponding co-captured secondary image are in a same group.

12. The method of claim 1, wherein the block of obtaining a reference primary image from the plurality of primary images, and obtaining a reference secondary image co-captured with the reference primary image in a same group from the plurality of secondary images, comprises:
preliminarily selecting some primary images with high definition and some corresponding secondary images with high definition from the plurality of primary images and the plurality of secondary images;
selecting the reference primary image from the some primary images with high definition, and selecting the corresponding reference secondary image co-captured with the reference primary image in the same group from the some secondary images with high definition.

13. The method of claim 1, wherein the multiframe-synthesizing noise-reduction process comprises:
reading values of pixel points corresponding to a same location of the plurality of primary images;
calculating a weighted-average value of the pixel points; and
generating a value of a corresponding pixel point at the same location of a synthesized image.

14. An image processing apparatus, comprising:
a shooting module, configured to control a primary camera to capture a plurality of primary images, and simultaneously control a secondary camera to capture a plurality of secondary images;
a first obtaining module, configured to obtain a reference primary image from the plurality of primary images, and obtain a reference secondary image co-captured with the reference primary image in a same group from the plurality of secondary images;
a second obtaining module, configured to start a multi-thread-based parallel processing mechanism, call a first thread to perform a multiframe-synthesizing noise-reduction process for the plurality of primary images so as to generate a target primary image, and simultaneously call a second thread to obtain depth information according to the reference primary image and the reference secondary image;
a processing module, configured to perform a blurring process for a background region of the target primary image according to the depth information.

15. The apparatus of claim 14, wherein the shooting module comprises:
a detecting unit, configured to detect brightness of shooting environment;
a shooting unit, configured to control the primary camera to capture the plurality of primary images, and simultaneously control the secondary camera to capture the plurality of secondary images when detecting the brightness is less than a preset threshold.

16. The apparatus of claim 14, wherein the processing module comprises:
an obtaining unit, configured to obtain first depth information of a foreground region and second depth information of the background region according to the depth information and a focus region;
a generating unit, configured to generate blurring strength according to the first depth information and the second depth information;
a processing unit, configured to perform the blurring process for the background region of the target primary image according to the blurring strength.

17. The apparatus of claim 14, wherein the plurality of primary images and the plurality of secondary images are captured during a preset period according to a same shooting instruction or a same shooting operation.

18. The apparatus of claim 17, wherein the plurality of primary images and the plurality of secondary images are captured under a same frequency, such that any one of the plurality of primary images is co-captured with a corresponding secondary image simultaneously, and the any one of the plurality of primary images and the corresponding co-captured secondary image are in a same group.

19. A computer device, comprising: a non-volatile storage and a processor, the storage stores a computer program capable of being called by the processor and running in the processor, wherein when the computer program is called by the processor and runs in the processor, the method as claimed in claim 1 is implemented.

* * * * *